United States Patent
Brown (10) Patent No.: US 10,920,626 B2
(45) Date of Patent: Feb. 16, 2021

(54) ELECTRIC PHASER STARTUP CONTROL METHOD

(71) Applicant: BorgWarner Inc., Auburn Hills, MI (US)

(72) Inventor: Daniel Brown, Freeville, NY (US)

(73) Assignee: BORGWARNER, INC., Auburn Hills, MI (US)

(*) Notice: Subject to any disclaimer, the term of this patent is extended or adjusted under 35 U.S.C. 154(b) by 0 days.

(21) Appl. No.: 15/897,262

(22) Filed: Feb. 15, 2018

(65) Prior Publication Data

US 2018/0230865 A1     Aug. 16, 2018

Related U.S. Application Data

(60) Provisional application No. 62/459,683, filed on Feb. 16, 2017.

(51) Int. Cl.
| | |
|---|---|
| F01L 1/344 | (2006.01) |
| F01L 1/352 | (2006.01) |
| H02K 11/215 | (2016.01) |
| F02D 13/02 | (2006.01) |
| F01L 1/356 | (2006.01) |
| H02K 7/116 | (2006.01) |
| F02D 41/00 | (2006.01) |

(Continued)

(52) U.S. Cl.
CPC .............. *F01L 1/344* (2013.01); *F01L 1/047* (2013.01); *F01L 1/352* (2013.01); *F01L 1/356* (2013.01); *F02D 13/0219* (2013.01); *F02D 41/009* (2013.01); *G01D 5/145* (2013.01); *H02K 7/116* (2013.01); *H02K 7/14* (2013.01); *H02K 11/215* (2016.01); *H02K 29/08* (2013.01); *F01L 2001/0535* (2013.01); *F01L 2250/04* (2013.01); *F01L 2820/032* (2013.01); *F01L 2820/041* (2013.01); *F01L 2820/042* (2013.01); *F02D 2013/0292* (2013.01); *F02D 2041/001* (2013.01)

(58) Field of Classification Search
CPC .............. F02D 13/0249; F02D 41/009; F02D 2013/0292; F02D 2041/001; H02K 7/14; H02K 7/116; H02K 29/08; H02K 11/215; F01L 1/356; F01L 1/352; F01L 1/047; F01L 2250/04; F01L 2001/0535; F01L 2820/042; F01L 2820/041; F01L 2820/032; G01D 5/145
See application file for complete search history.

(56) References Cited

U.S. PATENT DOCUMENTS

| | | | |
|---|---|---|---|
| 5,327,859 A | 7/1994 | Pierik et al. | |
| 5,548,995 A * | 8/1996 | Clinton | F01L 1/34 |
| | | | 701/99 |

(Continued)

*Primary Examiner* — Patrick Hamo
*Assistant Examiner* — Wesley G Harris
(74) *Attorney, Agent, or Firm* — Reising Ethington P.C.

(57) ABSTRACT

A system and method of controlling an angular position of a camshaft relative to an angular position of a crankshaft includes detecting rotational movement of an electric motor output shaft controlling a camshaft phaser; detecting rotational movement of the crankshaft; determining the relative difference between the rotational movement of the electric motor output shaft and the rotational movement of the crankshaft; and determining whether the angular position of the camshaft relative to the angular position of the crankshaft is advancing, retarding, or remaining constant.

15 Claims, 5 Drawing Sheets

(51) Int. Cl.
*H02K 29/08* (2006.01)
*H02K 7/14* (2006.01)
*F01L 1/047* (2006.01)
*G01D 5/14* (2006.01)
*F01L 1/053* (2006.01)

(56) References Cited

U.S. PATENT DOCUMENTS

| | | | |
|---|---|---|---|
| 5,715,780 A * | 2/1998 | Haller | F01L 1/34406 123/90.17 |
| 6,000,375 A * | 12/1999 | Isobe | F01L 1/34 123/322 |
| 6,397,799 B1 * | 6/2002 | Carbonne | F01L 1/34 123/90.15 |
| 7,063,057 B1 | 6/2006 | Waters et al. | |
| 7,107,951 B2 | 9/2006 | Urushihata et al. | |
| 7,363,896 B2 | 4/2008 | Urushihata et al. | |
| 7,624,710 B2 | 12/2009 | Uehama et al. | |
| 7,814,878 B2 | 10/2010 | Petridis et al. | |
| 8,020,527 B2 * | 9/2011 | Mashiki | F01L 1/344 123/90.11 |
| 2002/0062685 A1 * | 5/2002 | Han | G01M 15/06 73/114.27 |
| 2004/0011311 A1 * | 1/2004 | Takahashi | F01L 1/34 123/90.15 |
| 2005/0028770 A1 * | 2/2005 | McCabe | F01L 1/34 123/90.17 |
| 2006/0042578 A1 * | 3/2006 | Izumi | F01L 1/022 123/90.17 |
| 2006/0042579 A1 * | 3/2006 | Izumi | F01L 1/022 123/90.17 |
| 2006/0178803 A1 * | 8/2006 | Nakamura | F01L 1/34 701/114 |
| 2007/0101956 A1 * | 5/2007 | Schafer | F01L 1/352 123/90.15 |
| 2016/0348603 A1 * | 12/2016 | Mikawa | F02D 41/222 |

* cited by examiner

ELECTRIC PHASER STARTUP CONTROL METHOD

CROSS-REFERENCE TO RELATED APPLICATIONS

This application claims the benefit of U.S. Patent Application No. 62/459,683 filed on Feb. 16, 2017, the disclosure of which is herein incorporated by reference in its entirety.

TECHNICAL FIELD

The present application relates to controlling camshaft phasers and, more particularly, to controlling the phase of camshaft phasers of an internal combustion engine during a startup period.

BACKGROUND

Internal combustion engines include camshafts that open and close valves regulating the combustion of fuel and air within combustion chambers of the engines. The opening and closing of the valves are carefully timed relative to a variety of events, such as the injection and combustion of fuel into the combustion chamber and the location of the piston relative to top-dead center (TDC). Camshaft(s) are driven by the rotation of the crankshaft via a drive member connecting these elements, such as a belt or chain. In the past, a fixed relationship existed between the rotation of the crankshaft and the rotation of the camshaft. However, internal combustion engines increasingly use camshaft phasers that vary the phase of camshaft rotation relative to crankshaft rotation. Camshaft phasers can, in some implementations, be actuated by electric motors that advance or retard the opening/closing of valves relative to crankshaft rotation. When an internal combustion engine is started, the angular position of the camshaft relative to the crankshaft may not be precisely known, either because their positions have not been located, or because the camshaft rotation is too slow to provide updated position information from the cam sensor in a timely manner. But it is helpful to regulate the angular position of the camshaft relative to the angular position of the crankshaft despite lacking the precise position of either to ensure efficient engine operation.

SUMMARY

In one embodiment, a method of controlling an angular position of a camshaft relative to an angular position of a crankshaft includes detecting rotational movement of an electric motor output shaft controlling a camshaft phaser; detecting rotational movement of the crankshaft; determining the relative difference between the rotational movement of the electric motor output shaft and the rotational movement of the crankshaft; determining whether the angular position of the camshaft relative to the angular position of the crankshaft is advancing, retarding, or remaining constant; and changing the angular position of the camshaft by sending a signal to the electric phaser motor.

In another embodiment, a method of controlling an angular position of a camshaft relative to an angular position of a crankshaft includes receiving a signal from an electric phaser motor that includes a plurality of pulses created in response to the rotation of an electric motor output shaft controlling a camshaft phaser; receiving a signal from a crankshaft position sensor that includes a plurality of pulses created based on the rotation of a crankshaft; determining a ratio between the frequency of pulses received from the electric phaser motor and the frequency of pulses received from the crankshaft position sensor; determining whether the ratio is higher than, lower than, or equal to a predetermined value; and determining that the angular position of the camshaft relative to the angular position of the crankshaft is advancing, retarding, or remaining constant.

In yet another embodiment, a system of controlling an angular position of a camshaft relative to an angular position of a crankshaft includes a system processing device configured to receive a first signal comprising a plurality of signal pulses from a crank position sensor detecting rotational movement of a crankshaft and a second signal comprising a plurality of signal pulses from one or more electric motor sensors monitoring the rotational motion of a rotor of an electric phaser motor that controls a camshaft phaser. The system processing device determines the relative difference between the rotational movement of the rotor of the electric phaser motor and the rotational movement of the crankshaft and determines whether the angular position of the camshaft relative to the angular position of the crankshaft is advancing, retarding, or remaining constant based on the relative difference between the rotational movement of the rotor of the electric phaser motor and the rotational movement of the crankshaft.

DETAILED DESCRIPTION

A system and method of controlling an angular position of a camshaft relative to an angular position of a crankshaft are described below. The system and method involve receiving signals from a crankshaft sensor and sensors monitoring an electric phaser motor controlling a camshaft phaser to determine a phase relationship of the camshaft relative to the crankshaft. The phase relationship refers to the angular position of the camshaft relative to the angular position of the crankshaft. When an internal combustion engine has been turned off or deactivated so that it has stopped operating, microcontroller(s) or microprocessor(s) that regulate the angular displacement of a camshaft relative to a crankshaft using a camshaft phaser may not know the precise angular position of the camshaft relative to the angular position of the crankshaft. Later, when a user subsequently activates an ignition system for the internal combustion engine and rotates the crankshaft to begin combustion and engine operation, the microcontroller(s) can determine whether the phase relationship between the camshaft and the crankshaft is advancing, retarding, or staying the same without knowing the precise angular position of the crankshaft, the camshaft, or both. A microcontroller may then maintain or adjust a command it communicates to the electric phaser motor to advance, retard, or maintain the phase relationship between the camshaft and the crankshaft based on the system described herein. In the absence of knowledge of the angle between the camshaft and crankshaft, the control of the engine may benefit from urging the phaser towards a fixed stop position in the advanced or retarded direction to be closer to a desired phase position. Once the phase relationship between the camshaft and crankshaft is known to an acceptable accuracy and/or update rate, control of the phaser may revert to a control method known in the art that relies on the phase relationship as the feedback element in a closed loop control, for example.

As the crankshaft begins rotating to start the engine, the microcontroller(s) can direct the electric phaser motor to maintain the current phase relationship of the camshaft with respect to the crankshaft without regard to the actual angular position of either the crankshaft or the camshaft. Or the microcontroller(s) can direct the electric phaser motor to advance or retard the phase relationship of the camshaft relative to the crankshaft. The system and method can determine a ratio of signal pulses received from a crankshaft sensor to signal pulses received from sensors monitoring the rotation of an output shaft of the electric phaser motor controlling the camshaft phaser. This ratio is used to determine whether the phase relationship between the camshaft and the crankshaft is advancing, retarding, or remaining constant. This ratio or the determination of how the phase relationship between the camshaft and crankshaft is changing can be used by the microcontroller(s) as feedback in the control of the electric phaser motor.

Turning to FIGS. 1-4, an embodiment of a system 10 of controlling the angular position of a camshaft relative to the angular position of a crankshaft is shown. The system 10 includes electronic hardware that monitors the angular movement of the crankshaft and the camshaft(s) of an internal combustion engine 12. The angular movement of the crankshaft and camshaft(s) relative to each other can be used to generate electric motor control signals for advancing, retarding, or maintaining the phase relationship between the crankshaft and the camshaft(s) via a camshaft phaser 14. The internal combustion engine 12 includes a crankshaft 16 and one or more camshafts 18 (one is shown). A cam sprocket 20 is attached to each camshaft 18. Camshaft 18 can be mechanically driven by the crank sprocket 22 linked to a nose 24 of the crankshaft 16 via the cam sprocket 20. As the crankshaft 14 rotates, a driven member 26, such as a chain or belt, drives the camshaft 18 by translating rotational movement of the crankshaft 16 into rotational movement of the camshaft 18. The crank sprocket 22 includes half as many teeth as the cam sprocket such that two 360 degree rotations of the crankshaft 16 results in one 360 degree rotation of the camshaft 18. The rotational movement of the crankshaft 16 can occur in response to a starter motor selectively engaging a flywheel during startup cranking or in response to piston movement during engine operation.

Figure 1:
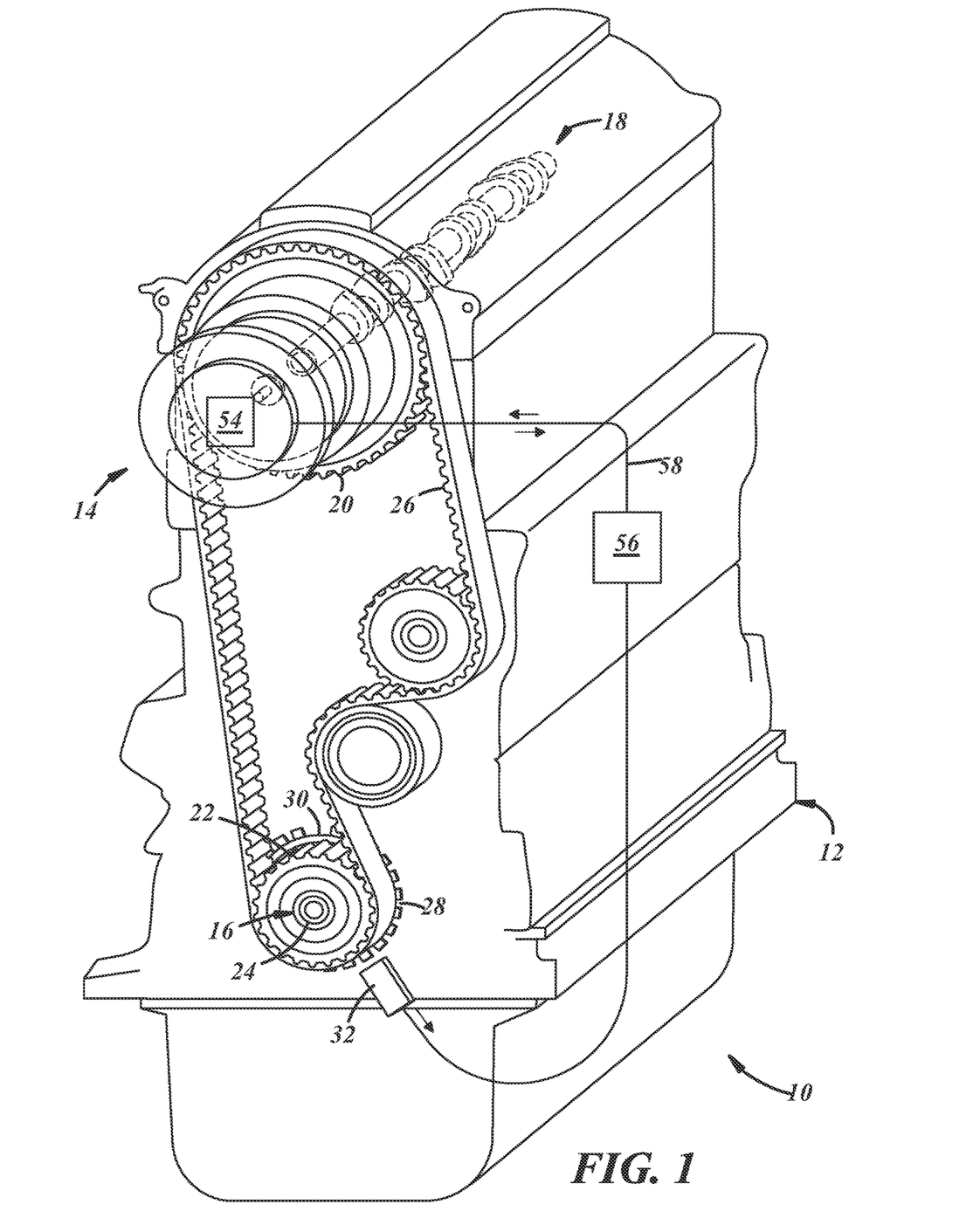
FIG. 1 is a perspective view depicting an implementation of a system of controlling an angular position of a camshaft relative to an angular position of a crankshaft and an internal combustion engine including the camshaft and the crankshaft that are controlled by the system.

The crankshaft 16 includes a crank wheel 28 that can be used to identify the angular position of the crankshaft 16. The crank wheel 28 is mounted to the nose 24 of the crankshaft 16 adjacent to the crank sprocket 22 and can be implemented as a 60-2 crank wheel. This means that the crank wheel 28 includes 58 evenly-spaced teeth around the circumference of the wheel 28 and a space along the circumference where two teeth have purposefully been omitted. This space is also called a crank index 30 that identifies a defined point of crankshaft rotation relative to combustion, such as top-dead center (TDC). While this embodiment is described with regard to the 60-2 crank wheel, it should be appreciated that crank wheels having different numbers of teeth and index sizes could be used instead with equal success. As the crank wheel 28 rotates with the crankshaft 16, a crank position sensor 32 located in close proximity to the teeth on the crank wheel 28 generates a signal that indicates an absence or presence of the teeth on the crank wheel 28. The crank position sensor 32 can be implemented as a hall-effect sensor that generates a high-voltage level when a tooth passes the sensor 32 and a low-voltage level when the index 30 passes the sensor 32 or when the sensor 32 is located in between teeth on the crank wheel 28. The output from the crank position sensor 32 can be sent to a microcontroller. This will be discussed in more detail below. In response to an index on the crank wheel 28 that has eliminated teeth from a regularly spaced pattern, the microcontroller(s) may recognize the change and provide a signal in place of the missing signals. If the microcontroller is counting crank pulses, then the microcontroller may instead add the missing teeth to the count after passing and recognizing the index location.

Figure 4:
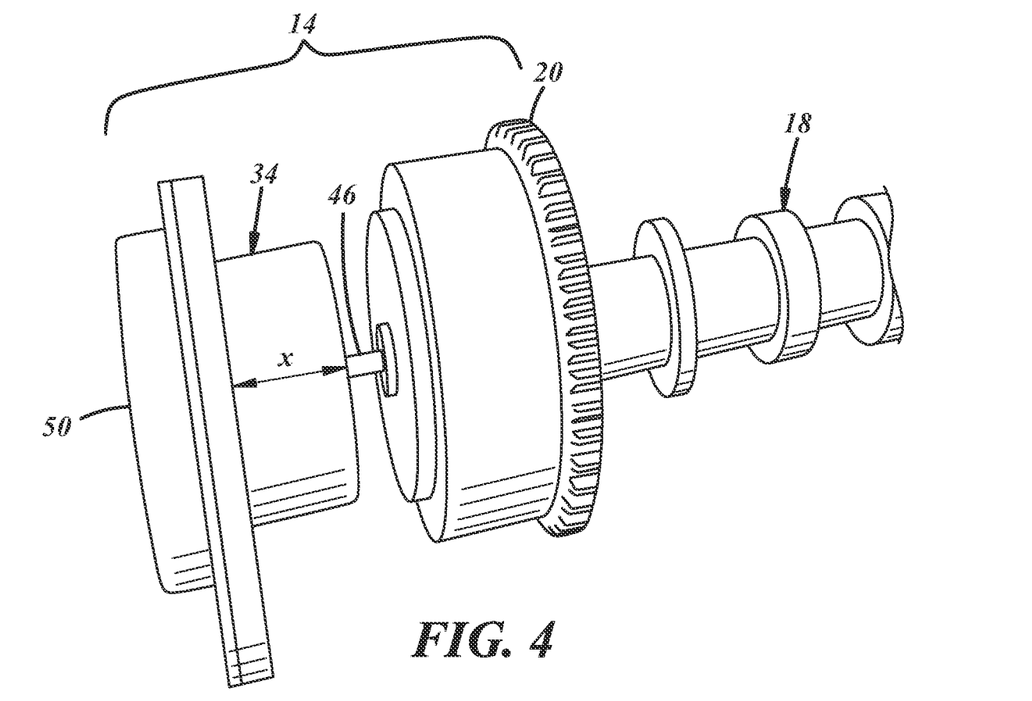
FIG. 4 is a perspective view depicting an implementation of a cam phaser used with a system of controlling an angular position of a camshaft relative to an angular position of a crankshaft.

The camshaft phaser 14 controls the angular position of the camshaft 18 relative to the angular position of the crankshaft 16. An electric phaser motor 34 regulates the phase of the camshaft 18 relative to the crankshaft 16 by driving a mechanical gearbox of the camshaft phaser 14 via an output shaft 46 of the electric phaser motor 34 according to a received motor control signal. The system 10 can be used with a variety of different cam phasers controlled by electric motors where the electric motor is rotating in order to maintain phase, such as the split-ring gear planetary cam phaser described in U.S. Patent Application Publication No. 2015/0315939, the contents of which are incorporated by reference. The electric motor driven cam phaser 14 includes the cam sprocket 20 and an electric phaser motor 34 that can be rotationally engaged with a sun gear of a planetary gearset (not shown) to alter the angular position of the camshaft relative to the angular position of the crankshaft. The planetary gearset engages two ring gears each of which have different numbers of teeth. One ring gear is included on a portion of the camshaft phaser 14 that is attached to the cam sprocket 20 whereas the other ring gear is attached to the camshaft 18. When the sun gear is rotated by the electric phaser motor 34 at the same speed as the two ring gears, a constant cam phase is maintained. However, when the electric phaser motor 34 drives the sun gear at a different speed than the ring gears, a slightly different speed of one ring gear to the other ring gear causes a change in cam phase. The camshaft 18 can be phase shifted over a range of angular positions that are defined by stops limiting changes in angular position of the camshaft 18 between a fully retarded position and a fully advanced position. In some implementations, this range can be as large as 140 degrees. It should be understood that this is one particular implementation of a cam phaser controlled by an electric motor and that other cam phaser designs including electric motors could also be successfully used.

Figure 2:
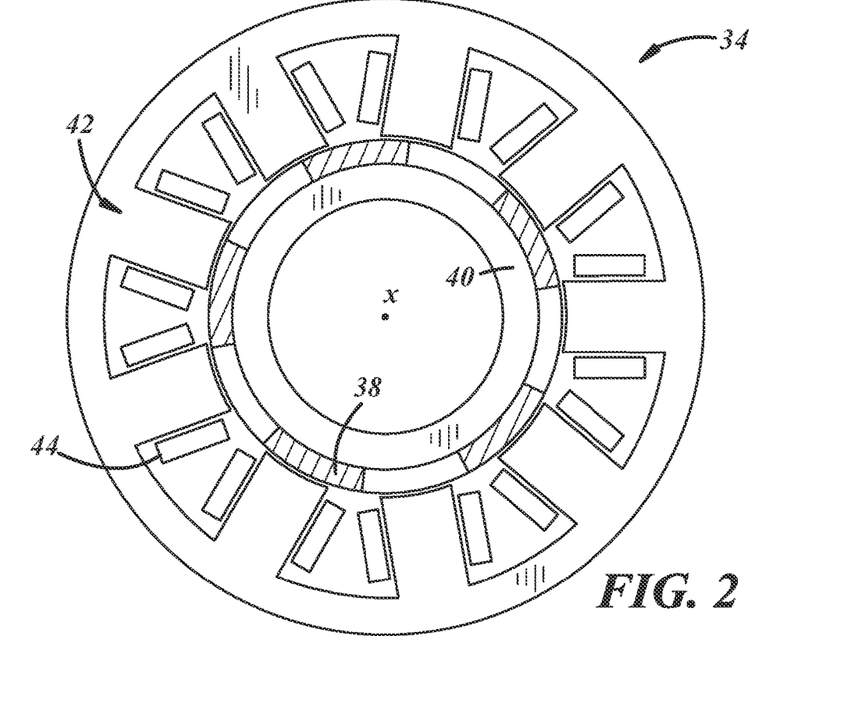
FIG. 2 is a cross-section depicting an implementation of an electric motor used with a system of controlling an angular position of a camshaft relative to an angular position of a crankshaft.
Figure 3:
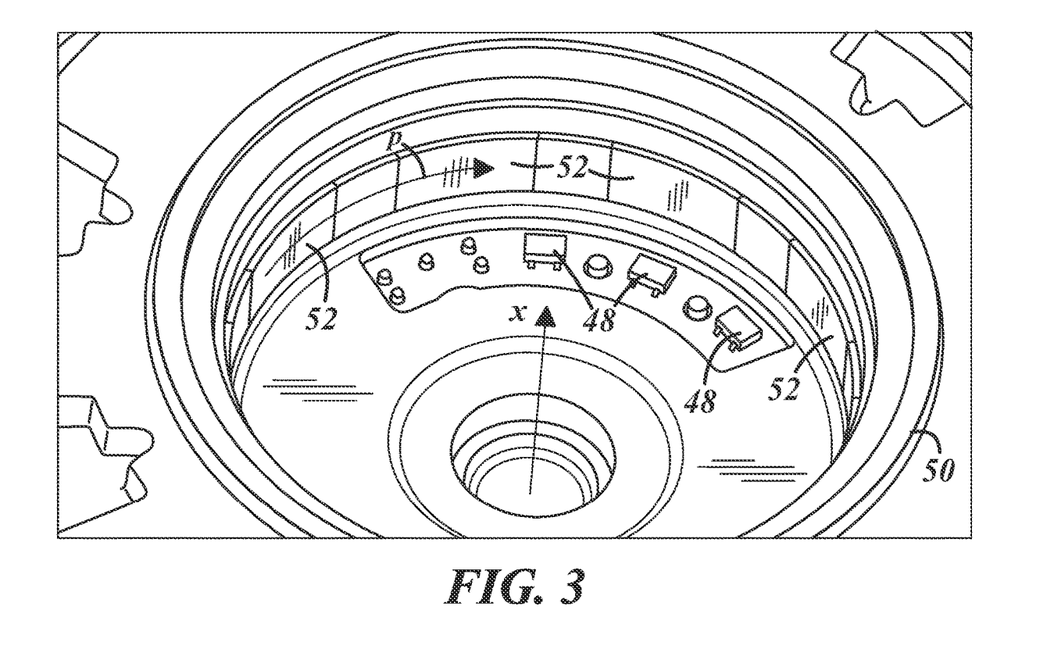
FIG. 3 is a perspective view depicting an implementation of a cover of an electric motor used with a system of controlling an angular position of a camshaft relative to an angular position of a crankshaft.

The electric phaser motor 34 of the camshaft phaser 14 includes a defined number of magnets 38 located on a rotor 40 that is connected to an output shaft 46. FIG. 2 depicts a cross-section of the motor 34 with the magnets 38, the rotor 40, a stator 42, and a coil 44. The number of magnets 38 used in the electric phaser motor 34 can depend on the design of the electric phaser motor 34. In the embodiment shown in FIG. 2, ten magnets 38 are included on the rotor 40. When current is applied to the electric phaser motor 34, the magnets 38 rotate about an axis (x) coaxial to the output shaft 46. As is shown in FIG. 3, a defined number of electric motor sensors 48 are positioned near a rotational path (p) of the magnets 38 of the electric phaser motor 34 so that when the motor 34 is operational and the output shaft 46 is rotating, the sensors 48 detect the absence or presence of those magnets 38 as the rotor 40 moves. FIG. 3 also depicts an electric motor cover 50 as it is removed from the electric phaser motor 34 to expose an inside portion of the cover 50 that receives the rotor 40 of the motor 34. The inside portion of the cover 50 includes the electric motor sensors 48 as well as stator poles 52 of the stator 42. Although hall sensors are shown in the cover interacting with the magnets of the rotor, the sensors could be of any type, including hall sensors that interact with a separate sensor magnet ring with any number of magnetic north and south poles facing the sensors as the motor rotates. It is also possible to use optical sensors for determining position of the output shaft 46. Preferably, the hall sensors are the same ones used for commutating the brushless DC motor. It is also preferable to use more than one hall sensor or another type of sensor to indicate the direction of rotation of the electric motor. The camshaft phaser 14 can also be backdriven such that the camshaft 18 reverses the rotational direction the electric phaser motor 34 normally travels in during operation. A number of factors may cause this. For example, during cranking the camshaft 18 and its lobes may carry an amount of inertia that does not easily overcome the spring force exerted on the valves by the valve springs. As a result of the spring force exerted on the cam lobes, the electric phaser motor 34 may change its rotational direction momentarily. The electric motor sensors 48 indicate this change.

In an implementation in which the electric phaser motor 34 includes ten magnets 38 and three hall-effect sensors 48 located such that when the motor 34 is operational the magnets 38 induce a voltage in the hall-effect sensors 48 as the magnets 38 pass by along path (p), one 360 degree rotation of the output shaft 46 generates thirty high-voltage pulses from the sensors 48. The signals from the three sensors can be combined to produce a signal with 30 pulses. Alternatively, a signal with 15 pulses can be produced where a microcontroller interprets each rising or falling edge as the event used to calculate the motor movement and pulse frequency. The term high-voltage in this context can mean 5 volts (V) while low-voltage can refer to a 0 V value output by the hall-effect sensors 48 but other values are possible. A microprocessor in the form of an electric motor controller 54 can receive the output from the sensors 48 detecting passing magnets 38 of the electric phaser motor 34 and output an electric motor position signal indicating the frequency with which the magnets 38 are detected. The output from the sensors 48 can be used to determine the angular or rotational speed of the output shaft 46 of the electric phaser motor 34. In one embodiment, the electric motor controller 54 can be implemented using a three-phase brushless direct current (BLDC) motor controller and MOSFET driver.

In addition to the electric motor controller 54, the system 10 can include a system processing device 56 as another, separate microprocessor/microcontroller, such as an electronic control unit (ECU), that receives an electric motor position signal from the electric motor controller 54 as well as output from the crank position sensor 32 and executes the methods disclosed herein. The system processing device 56 can be any type of device capable of processing electronic instructions including microprocessors, microcontrollers, host processors, controllers, vehicle communication processors, and application specific integrated circuits (ASICs). It can be a dedicated processor used only to carry out the described methods or can be shared with other vehicle systems. The system processing device 56 executes various types of digitally-stored instructions, such as software or firmware programs stored in memory. Communications between the sensors 32, 48, the electric motor controller 54, and the system processing device 56 can be carried out over a communications bus 58, such as those that are implemented using a controller area network (CAN) protocol. However, it should be appreciated that other implementations are possible in which at least some of these elements could be implemented together on a printed circuit board.

Figure 5:
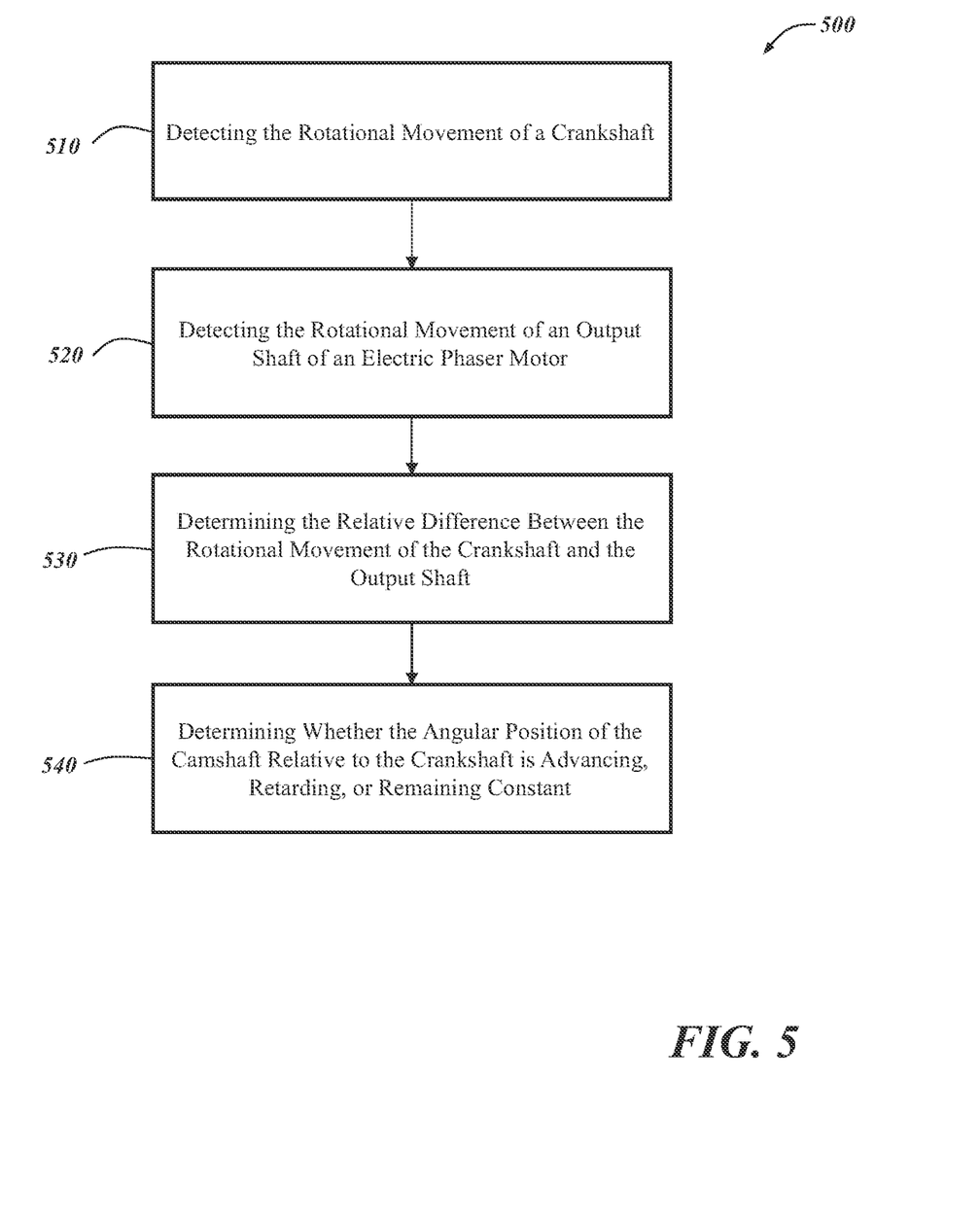
FIG. 5 is a flow chart depicting an implementation of a method of controlling an angular position of a camshaft relative to an angular position of a crankshaft.

Turning to FIG. 5, one embodiment of a method (500) of controlling the angular position of the camshaft 18 relative to the angular position of the crankshaft 16 is shown. The method 500 begins at step 510 by detecting the rotational movement of the crankshaft 16. As the crankshaft 16 rotates as part of starting the engine 12 or as the engine 12 operates, the crank position sensor 32 outputs a signal that includes a plurality of pulses created in response to the teeth of the crank wheel 28 passing the crank position sensor 28. The signal output from the crank position sensor 28 exists as a pulse train of low (0V) and high (5V) pulses that represent the absence and presence, for example, of teeth on the crank wheel 28. The signal could also be a short pulse of fixed or variable duration to indicate the edge or center of the teeth of the crank wheel. The signal can be communicated from the crank position sensor 32 to the system processing device 56 via the communications bus 58. The method 500 proceeds to step 520.

At step 520, the rotational movement of the rotor 40 or output shaft 46 of the electric phaser motor 34 controlling the camshaft phaser 14 is detected. To control a phase relationship between the crankshaft 16 and the camshaft 18 using the camshaft phaser 14, the rotor 40 of the electric phaser motor 34 rotates at a variable speed such that increasing speed, decreasing speed, or maintaining a particular speed can retard, advance, or maintain, respectively, the angular position of the camshaft 18 relative to the angular position of the crankshaft 16. As discussed above, the electric phaser motor 34 includes a rotor 40 having a plurality of magnets 38. And as the rotor 40 and attached output shaft 46 rotate, sensors 48 produce a high pulse each time a magnet 38 included on the rotor 40 passes by each sensor 48. Often, the hall sensors transition when the magnetic field reverses polarity.

In an implementation in which the electric phaser motor 34 uses a rotor 40 including ten magnets 38 and three sensors 48 placed so that each sensor detects each magnet, the electric motor controller 54 receives 30 pulses per rotation of the rotor/output shaft. The electric motor controller 54 can transmit the pulses received from the sensors 48 to the system processing device 56 via the communications bus 50. The method 500 proceeds to step 530.

At step 530, the relative difference between the rotational movement of the rotor 40 of the electric phaser motor 34 and the rotational movement of the crankshaft 16 is determined. This can be implemented by determining a ratio between the pulses received from the crank position sensor 32 and the pulses received from the electric motor sensors 48 monitoring the electric phaser motor 34. After receiving pulses from the crank position sensor 32 and pulses from the electric motor sensors 48, the system processing device 56 can calculate the ratio of these pulses. The ratio can be determined in a number of ways, such as by dividing the pulses received from the crank position sensor 32 by the number of pulses received from the electric motor sensors 48 over a defined period of time. Or the ratio can be determined by measuring the time between pulses received from the crank position sensor 32 and the time between pulses received from the electric motor sensors 48 and dividing the time measurements of each to create a ratio.

Figure 6:
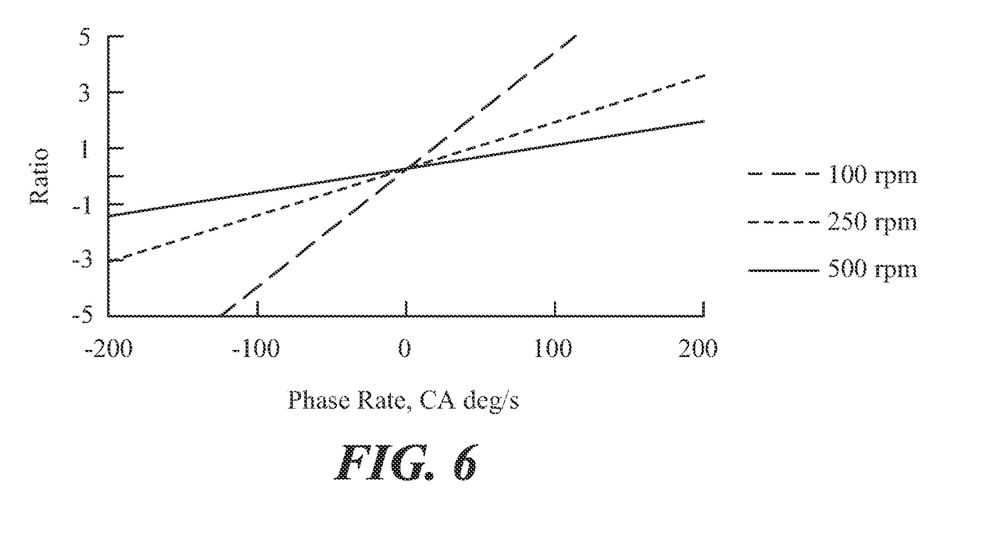
FIG. 6 is a chart showing the ratio values used in an embodiment of the system of controlling an angular position of a camshaft relative to an angular position of a crankshaft.

Turning to FIG. 6, a chart 600 is shown depicting how ratio values change depending on the rotational speed of the crankshaft 16. As can be appreciated from the chart, increases in revolutions per minute (RPM) of the crankshaft 16 can bring about a change in the phase rate in crank angle (CA) degrees per second measured at the same ratio values. The values depicted on the chart 600 are based on an electric phaser motor 34 that generates 30 pulses per rotation and a camshaft phaser 14 having a 100:1 gear ratio. The system processing device 56 can maintain different target ratio values for a plurality of RPM values. As can be appreciated from the chart, the ratios can be negative as the relative phase between the crankshaft 16 and the camshaft 18 is retarded.

Returning to FIG. 5, it is also possible to determine the ratio by establishing a fixed number of one type of pulses to count, from either the electric motor sensors 48 or the crank position sensor 32. After counting the fixed number of pulses of a particular type the system electric processing device 56 can determine how many pulses of a different type are received while counting the fixed number. This can be helpful to determine when to adjust the camshaft phaser 14 to attain the desired ratio independent of the speed at which the crankshaft 16 rotates. And it should be understood that the system 10 can change the type of pulse used as a basis for the fixed number of pulses and that change can be made based on the rotational speed of the crankshaft 16. In one example, the system processing device 56 sets a fixed number of crankshaft pulses to monitor and then determines how many pulses were received from the electric motor sensors 48 during the time the fixed number of crankshaft pulses were received. Using the fixed number of crankshaft pulses can be helpful when the system processing device 56 is not receiving any pulses from the electric motor sensors 48 despite the rotation of the crankshaft 16. The lack of pulses from the sensors 48 may occur when the crankshaft 16 is rotating relatively slowly, such as when the engine 12 is being cranked or started. When the electric motor sensors 48 are not generating pulses while the system electric processing device 56 counts the fixed number of crankshaft pulses, the device 56 may determine that the ratio is zero. However, the actual ratio is between $-1/x$ and $1/x$ when counting a fixed number (x) of pulses.

At faster phase rates, the system processing device 56 can begin using a fixed rate of pulses received from the electric motor sensors 48 and determine how many crankshaft pulses are received while the fixed rate of pulses are received. It is possible to configure the system processing device 56 to switch between using the crankshaft pulses as the basis for the fixed number of pulses and using the electric motor sensors 48 as the fixed number of pulses once a defined ratio has been reached, such as 1:1 or 2:1.

The system processing device 56 could determine whether the ratio is higher than, lower than, or equal to a predetermined value. An example of how the ratio between frequency of pulses received from the crank sensor and the frequency of pulses received from electric motor sensors 48 monitoring the electric phaser motor 34 can be explained based on the example begun above.

In that example, the crank wheel 28 includes 58 teeth and a two-tooth index 30 while the electric phaser motor 34 includes a ten magnet rotor 40 attached to the output shaft 46 with three sensors 48 to monitor the magnets 38. As the crankshaft 16 and the rotor 40/output shaft 46 of the electric phaser motor 34 rotate, the system processing device 56 receives the pulsed signals included with the crank position sensor output signal and electric motor position signal via the communications bus 58. The system processing device 56 can then determine how many pulses are received from the crank position sensor 32 for every pulse received from the electric motor sensors 48 and included in the electric motor position signal. In this example, assuming one rotation of the camshaft 18 for every two rotations of the crankshaft 16, the crank position sensor 32 will output four pulses for every pulse output by the electric motor sensors 48 if the electric phaser motor 34 is maintaining a constant phase relationship such that the angular position of the crankshaft 16 remains constant relative to the angular position of the camshaft 18. By measuring the relationship between pulses output by the crank position sensor 32 relative to the electric motor sensors 48, the system 10 does not need to precisely determine the angular position of either the crankshaft 16 or the camshaft 18. Instead, the phase relationship of the crankshaft 16 relative to the camshaft 18 and the change in that relationship can be used with an initial estimate of camshaft angular position or phase to control the camshaft phase during engine startup. The method 500 proceeds to step 540.

At step 540, it is determined whether the angular position of the camshaft 18 relative to the angular position of the crankshaft 16 is advancing, retarding, or remaining constant based on relative difference between the rotational movement of the output shaft 46 and the rotational movement of the crankshaft 16. The system processing device 56 can determine whether the detected ratio of pulses received from the crank position sensor 32 and pulses received from the electric motor sensors 48 equals a ratio that indicates a constant phase between the crankshaft 16 and the camshaft 18. Continuing the example discussed above, the system processing device 56 can access a lookup table from an internal or external memory device in which a ratio is stored that indicates a constant phase relationship between the crankshaft 16 and the cam shaft 18. This ratio can be dependent on RPM of crankshaft rotation. In the above example, the lookup table would indicate that the phase relationship is constant when four crankshaft pulses are received for every pulse received from the electric motor sensors 48. The ratio between pulses output by the crank position sensor 32 relative to the electric motor sensors 48 can be compared to the ratio value stored in the lookup table by the system processing device 56, which generates a motor control signal for controlling the electric phaser motor 34 based on the comparison.

Depending on initial assumptions established as part of starting the engine, the system processing device 56 can increase, decrease, or maintain the torque or speed of the output shaft 46 of the electric phaser motor 34 based on the comparison of the determined ratio of pulses received from the sensors 48 to the ratio value stored in the lookup table. After an ignition system for the internal combustion engine 12 is activated but before cranking to start the engine 12 has begun, the system processing device 56 can establish one or more initial assumptions to be used for controlling the electric phaser motor 34 and angular position of the camshaft 18 relative to the angular position of the crankshaft 16. These initial assumptions include an estimate of camshaft angular position relative to crankshaft angular position, current engine temperature, engine temperature when the engine was last turned off, as well as other variables that are useful for starting an internal combustion engine.

In one example, the system processing device 56 can establish the current temperature of the engine, the temperature when the engine 12 was last turned off, and an estimate of camshaft angular position as initial assumptions to control the phase of the camshaft 18. Given these initial assumptions, the system processing device 56 may determine that the engine 12 is currently cold but was at normal operating temperature when last turned off. The system processing device 56 can receive this information from a body control module (not shown) or other sensor/ECU combinations that monitor the temperature of the oil or coolant used by the engine 12 and communicates those values to the device 56 over the communications bus 58. The system processing device 56 can store previously received oil/coolant temperature values as well as monitor currently received oil/coolant temperature values. The system processing device 56 can compare the combination of a normal operating temperature value at shut down and cold temperature value at start with a lookup table that stores a corresponding camshaft phase position with a temperature shutdown/startup combination.

The lookup table can indicate that the angular position of the camshaft may be initially advanced relative to the angular position of the crankshaft given that the engine 12 was at a normal operating temperature when shut down. As the engine is cranked, the system processing device 48 can determine whether the ratio of the pulses received from the crank position sensor 32 to the pulses received from the electric motor sensors 48 is equal to a predetermined value corresponding to a desired phase rate. As pointed out above, this indicates that the output shaft 46 of the electric phaser motor 34 is driving the camshaft phaser 14 such that the phase relationship of the camshaft 18 to the crankshaft 16 matches the desired phase. If not, the system processing device 56 can generate a motor control signal that is transmitted to the electric phaser motor 34 causing it to increase or decrease the rotational speed of the output shaft 46 thereby advancing or retarding the camshaft or angular position of the camshaft 18 relative to the angular position of the crankshaft 16. The system processing device 56 can be used to implement any one of a number of control systems that generate motor control signals that regulate the rotational speed of the electric phaser motor 34. The method 500 then ends.

Figure 7:
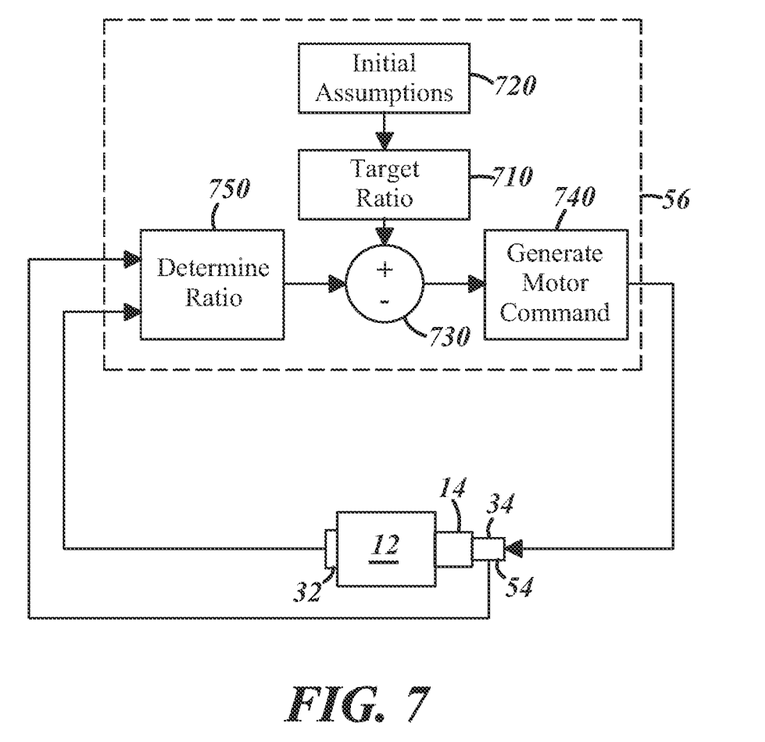
FIG. 7 is a diagram depicting another implementation of a system of controlling an angular position of a camshaft relative to an angular position of a crankshaft.

FIG. 7 depicts another embodiment of the system 10 of controlling an angular position of the camshaft 18 relative to an angular position of the crankshaft 16. The system 10 includes the engine 12, the camshaft phaser 14, the crank position sensor 32, the electric phaser motor 34, and the system processing device 56. The system 10 represents a closed-loop system based on the comparison of signal pulses from the crank position sensor 32 to pulses received from the electric phaser motor 34. The system processing device 56 can determine a target ratio of signal pulses received from the crank position sensor 32 to pulses received from the electric phaser motor 34 (step 710). This target ratio may be selected based on a number of factors, such as the initial assumptions discussed above, the RPM of the crankshaft 16, or both (step 720). The system processing device 56 compares the target ratio with the currently determined ratio (step 730) and generates a motor command signal (step 740) that the device 56 transmits to the electric motor controller 54. This command signal directs the electric phaser motor 34 to increase, decrease, or maintain the present rotational speed of the output shaft 46. As the crankshaft 16 of the engine 12 continues to rotate, the system processing device 56 receives pulses from the electric phaser motor 34 of the camshaft phaser 14 and pulses from the crank position sensor 32. The system processing device 56 determines the ratio between the pulses using the techniques described above and generates an updated determined ratio that the device 56 can compare to the target ratio (step 750). Depending on whether the determined ratio is lower than, higher than, or equal to the target ratio, the system processing device 56 can increase, decrease, or maintain the speed of the output shaft 46 of the electric phaser motor 34. The system 10 may be turned off once the camshaft phase position is known relative to the crankshaft 16 and control of the electric phaser motor 34 is turned over to another controller that relies on camshaft sensor information.

When the electric phaser motor 34 spins at a low enough speed, the electric motor sensors 48 may not produce any pulses for the microcontroller to use within an allotted window for a ratio comparison update. For instance, that window can be 4-8 crank pulses. Since the electric phaser motor 34 is not spinning at the same rate as the camshaft 18, the camshaft phase is changing with respect to the crankshaft 16. The actual ratio may not be zero, but since a given amount of angle or time has passed since the last pulse from the electric motor sensors 48, a bound on the ratio can be calculated, and the electric phaser motor 34 commanded to either advance, retard, or maintain the phase relationship between camshaft 18 and crankshaft 16.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of controlling an angular position of a camshaft relative to an angular position of a crankshaft, comprising the steps of:

(a) detecting rotational movement of an electric motor output shaft controlling a camshaft phaser;
(b) detecting rotational movement of the crankshaft;
(c) determining a relative difference between the rotational movement of the electric motor output shaft and the rotational movement of the crankshaft;
(d) determining whether a phase relationship of the camshaft relative to the crankshaft is advancing, retarding, or remaining constant based on step (c) before the angular position of the crankshaft or the camshaft is known; and
(e) changing the angular position of the camshaft in response to step (d) by sending a signal to an electric phaser motor.

2. The method of claim 1, wherein the rotational movement of the electric motor output shaft is measured by one or more hall-effect sensors.

3. The method of claim 1, wherein the rotational movement of the crankshaft is detected by a crank position sensor that monitors a crank wheel fixedly attached to the crankshaft.

4. The method of claim 1; wherein step (c) further comprises comparing a frequency of pulses received from a crank position sensor with a frequency of pulses induced by the electric phaser motor controlling the camshaft phaser via the electric motor output shaft.

5. The method of claim 1, further comprising the step of changing the angular position of the camshaft relative to the angular position of the crankshaft by changing a rotational speed of the electric motor output shaft.

6. A method of controlling an angular position of a camshaft relative to an angular position of a crankshaft, comprising the steps of:
(a) receiving a signal from an electric phaser motor that includes a plurality of pulses created in response to a rotation of an electric motor output shaft controlling a camshaft phaser;
(b) receiving a signal from a crank position sensor that includes a plurality of pulses created based on a rotation of a crankshaft;
(c) determining a ratio between a frequency of pulses received from the electric phaser motor and the frequency of pulses received from the crank position sensor;
(d) determining whether the ratio is higher than, lower than, or equal to a predetermined value;
(e) determining that a phase relationship of the camshaft relative to the crankshaft is advancing, retarding, or remaining constant based on step (d) before the angular position of the crankshaft or the camshaft is known; and
(f) changing the angular position of the camshaft in response to step (e) by sending a signal to the electric phaser motor.

7. The method of claim 6, wherein the plurality of pulses included in the signal received from the electric phaser motor are created by one or more hall-effect sensors.

8. The method of claim 6, wherein the plurality of pulses included in the signal received from the crank position sensor are controlled by a crank wheel fixedly attached to the crankshaft.

9. The method of claim 6, further comprising the step of changing the angular position of the camshaft relative to the angular position of the crankshaft by changing a rotational speed of the electric motor output shaft.

10. A system of controlling an angular position of a camshaft relative to an angular position of a crankshaft, comprising:
a system processing device configured to receive a first signal comprising a plurality of signal pulses from a crank position sensor detecting rotational movement of the crankshaft and a second signal comprising a plurality of signal pulses from one or more electric motor sensors monitoring a rotational motion of a rotor of an electric phaser motor that controls a camshaft phaser, wherein the system processing device determines a relative difference between the rotational movement of the rotor of the electric phaser motor and a rotational movement of the crankshaft, determines whether a phase relationship of the camshaft relative to the crankshaft is advancing, retarding, or remaining constant before the angular position of the crankshaft or the camshaft is known based on a relative difference between the rotational movement of the rotor of the electric phaser motor and the rotational movement of the crankshaft, and changes the angular position of the camshaft before the angular position of the crankshaft or the camshaft is known.

11. The system of claim 10 further comprising a camshaft phaser and the electric phaser motor.

12. The system of claim 10, further comprising an electric motor controller.

13. The system of claim 10, wherein the system processing device determines a ratio between signal pulses from the crank position sensor and signal pulses from the one more electric motor sensors such that the ratio is based on a quantity of pulses received within a temporal window including a predetermined number of crank pulses or a predetermined number of electric phaser motor pulses.

14. The system of claim 13, further comprising a closed-loop feedback to maintain the ratio.

15. The system of claim 10, wherein the one or more electric motor sensors indicate a direction of rotation of the electric phaser motor.

* * * * *